United States Patent
Pack et al.

(10) Patent No.: US 8,371,442 B1
(45) Date of Patent: Feb. 12, 2013

(54) MOBILE DIAGNOSTICS MODULE SUITED FOR COMPUTER DATA CENTERS

(75) Inventors: Mark A. Pack, Sterling, VA (US);
Corey Churgin, Herndon, VA (US);
Jalon Q. Zimmerman, Manassas, VA (US)

(73) Assignee: ABR Innovations, LLC, Sterling, VA (US)

( * ) Notice: Subject to any disclaimer, the term of this patent is extended or adjusted under 35 U.S.C. 154(b) by 233 days.

(21) Appl. No.: 12/785,920

(22) Filed: May 24, 2010

Related U.S. Application Data

(60) Provisional application No. 61/180,899, filed on May 25, 2009.

(51) Int. Cl.
*B65D 85/00* (2006.01)

(52) U.S. Cl. .................. 206/320; 190/115; 16/113.1

(58) Field of Classification Search ............ 220/756, 220/751, 482; 206/320; 190/11, 149, 115, 190/39, 117; 224/576, 275; 361/679.02, 361/679.27, 679.55; 248/339, 341; 280/655.1; 16/113.1
See application file for complete search history.

(56) References Cited

U.S. PATENT DOCUMENTS

| | | | | |
|---|---|---|---|---|
| 3,690,446 | A * | 9/1972 | EShour et al. ............... 206/525 |
| 5,050,760 | A * | 9/1991 | Garcia ........................ 220/751 |
| 6,418,010 | B1 * | 7/2002 | Sawyer ........................ 248/918 |
| 6,842,334 | B2 * | 1/2005 | Smith et al. .............. 361/679.02 |
| 7,232,105 | B2 * | 6/2007 | Want et al. .................... 248/691 |
| 7,322,583 | B2 * | 1/2008 | Kim et al. ........................ 280/37 |
| 7,438,308 | B2 * | 10/2008 | Kim et al. .................. 280/655.1 |
| 7,461,730 | B2 * | 12/2008 | Costa et al. ..................... 190/39 |
| 8,136,781 | B2 * | 3/2012 | Krohmer ....................... 248/339 |
| 2005/0103815 | A1 * | 5/2005 | Lee et al. ....................... 224/275 |

* cited by examiner

*Primary Examiner* — Andrew Perreault
(74) *Attorney, Agent, or Firm* — Navid Fanaeian, Esq.; DeWitt Ross & Stevens, S.C.

(57) ABSTRACT

An exemplary mobile module includes a device frame and/or a case, with the device frame positioned within, and (preferably immovably) affixed to, the case walls. An appendage extending from the top of the module may include a handle and/or an adjustable support mount (which preferably includes a flat portion and a valley) that allows the module to hang from a variety of surfaces (such as a cabinet roof/door). Optional (preferably adjustable) sidebars extending from the module sides provide stability when the module is hanging. Equipment such as display and input devices may be (preferably adjustably) affixed to the device frame, and communication ports (e.g., for serial connectivity) and power sources may be provided in the frame interior. Such equipment may be accessible through openings in the case walls that provide access to the case interior. A (preferably affixed) computer and a multi-function cable may enhance diagnosing and interfacing capabilities.

20 Claims, 8 Drawing Sheets

MOBILE DIAGNOSTICS MODULE SUITED FOR COMPUTER DATA CENTERS

CROSS-REFERENCE TO RELATED APPLICATIONS

This application claims priority under 35 USC §119(e) to U.S. Provisional Patent Application 61/180,899 filed May 25, 2009, the entirety of which is incorporated by reference herein.

FIELD OF THE INVENTION

This document concerns an invention relating generally to a mobile diagnostics module, and specifically to a mobile diagnostics module with a device frame and case suited for diagnosing computers in data centers.

BACKGROUND OF THE INVENTION

When a computer or server in a computer room or data center fails (or "crashes"), the server often cannot be diagnosed remotely; after all, the server's communication systems may be failing as well. A failing server is thus best diagnosed by physically bringing computer diagnostic equipment to the troubled server. In a data center, the equipment used to diagnose and fix the crashing server is often found on a rolling cart that can be rolled to the server requiring attention. Such carts are usually stored in data centers for when they are needed by such users as system administrators.

Data center rolling carts with diagnostic equipment can vary but generally have a monitor, keyboard, and mouse thereon. If a web server were to go down, the systems administrator could roll the cart to the data center cabinet holding the troubled web server. He or she would then assemble the equipment and hook up the monitor, keyboard, and mouse, to the server to begin troubleshooting the web server.

There are many shortcomings with using rolling carts in data centers for troubleshooting purposes. For one, they can be quite large and cumbersome to push around the data center. Because space is limited in data centers, data center cabinet aisles are usually quite tight, with just enough room for the cabinet doors to open. Trying to push a cart down an aisle and then maneuver around aisles, cabinets, open doors, and other data center personnel can become a challenge. Also, because of their size, it is usually not feasible to move a data center cart from one data center to another. Businesses with more than one data center would thus need to have rolling carts with diagnostic equipment in each of their data centers, raising costs.

Moreover, rolling carts with diagnostic equipment tend to be communal resources in data centers. If a business has multiple business units within one data center, all business units would likely share the same rolling carts, creating competition for the carts. As shared resources, they are generally not the responsibility of any single individual, making it difficult to ensure the proper care and maintenance of the carts. These rolling carts are highly susceptible to being disorganized and poorly maintained. If the rolling carts are unavailable, not returned to their proper place, or left in a state of disarray (for example, with cables/equipment missing, equipment malfunctioning, littered with trash, etc.), diagnosing and fixing the server can be considerably delayed, increasing the downtime of troubled servers. This is particularly troublesome when a mission-critical server must urgently be brought back online. Field technicians frequently run into this problem as well when visiting a client's data center. A technician that relies on the customer's carts can find himself or herself with the daunting task of finding one that is not being used and returning it to a usable state. Such lost time and server downtime quickly adds up and can be very costly.

Placing computer equipment in a conventional bag, such as a piece of luggage or a computer bag, does not overcome the shortcomings of rolling diagnostic carts. The equipment available in a bag is entirely dependent on the equipment that was left in the bag by the bag's most recent user. If a user does not pack or replace an input device or power adaptor, for example, the equipment in the bag may not be usable, and it takes time to inspect the contents of a bag before each use. Also, the equipment and accessories in the bag may be left in disarray. Even if the bag includes compartments that are sized to fit different accessories, there is no guarantee that the bag's last user will take the time necessary to organize the equipment. As such, the bag's next user might have to waste time digging through all of the bag's compartments to locate a desired device (assuming the needed equipment is somewhere to be found in the bag). Because such bags are intended for storage, equipment stored therein is usually not connected and ready to use. For example, components may be disconnected from each other, cords may be tangled, and accessories may be incompatible with each other. Further, even when a user arrives at a failing computer with a computer bag that includes all the needed equipment, he or she must unpack the separate pieces of equipment, assemble them, connect them with the server equipment, disassemble them when done, and repack them within the bag so that they are available in ready-to-use form for next time. These steps are inconvenient and time consuming, and prone to shortcuts that make it more difficult for subsequent users. Furthermore, these bags are not stably hangable for use in such settings as data centers.

What is needed is a mobile diagnostics module that is well suited for computer data centers.

SUMMARY OF THE INVENTION

The invention, which is defined by the claims set forth at the end of this document, is directed to mobile diagnostics module suited for data centers which at least partially alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring initially to FIGS. 1 and 2, an exemplary mobile diagnostics module 10 includes a case 100 with case walls surrounding a case interior 102 (see FIG. 4). A device frame 200, which is preferably anchored to the case walls, may be provided in the case interior 102. Diagnostics equipment may be affixed to the device frame 200 and positioned within the case interior 102. Using a support mount 300, the highly mobile module 10 can hang from the roof of a cabinet 20, a door 22, or virtually any surface. Particularly useful when used with cabinets 20 or door frames, optional sidebars 302, 304 extending from the sides of the module 10 provide support and stability that keeps the module 10 from swinging into the cabinet 20 or through the door frame when the module 10 is in use. The module 10 preferably incorporates equipment for, for example, interfacing with and diagnosing computers such as servers in data centers.

As shown in FIGS. 3A, 3B, and 4, the case 100 preferably includes a resealable first opening 104 that extends into the case interior 102 housing the device frame 200 and diagnostic equipment. The case walls may include a case top 106, and a case bottom 108 opposing the case top 106. The case walls may additionally include a case first side 110, and a case second side 112 opposing the case first side 110, the case first side 110 and the case second side 112 positioned between the case top 106 and the case bottom 108. An extendible appendage 306, with an appendage first end 308 and an opposing appendage second end 310, is preferably extendable from the case top 106 along an appendage plane. An appendage release latch 312 may lock/unlock the appendage 306 as it extends and retracts. The appendage first end 308 may be anchored to the case 100 and/or the device frame 200 of the module 10, and the appendage second end 310 may include an appendage handle 314 extending therefrom, the appendage handle 314 helping making the module 10 more portable. The case top 106 may also be provided with a case handle 114 to make the module 10 even more carryable.

Referring to FIG. 5, the support mount 300 extends from the appendage second end 310 along a support mount plane. The support mount 300 is preferably movable with respect to the appendage 306 between a support mount deployed position 316 and a support mount 300 stowed position 318, although the support mount 300 may alternatively be in a permanently deployed position. Although the support mount 300 may be made movable with respect to the appendage 306 in any way desired (such as through the pivoting motion of a hinge mechanism 344 (see FIG. 8)), the support mount plane in effect pivots with respect to the appendage plane as the support mount 300 moves with respect to the appendage 306.

In the deployed position 316, the support mount plane may make a 15 to 120 degree angle with the appendage plane, and the support mount 300 may extend at least an inch away from the appendage 306, allowing the module 10 to hang from a variety of surfaces. While in the stowed position 318 the support mount 300 is preferably closer to the appendage 306 than in the deployed position 316, making the module 10 easier to transport. As shown in FIG. 8, the support mount 300 is made more versatile by preferably including a flat portion 320 extending from a valley 322, or a valley 322 between opposing sides 320, 324 (for example, two flat portions 320, 324 on the sides of a concave valley 322). For traction, the support mount 300 may be provided with a nonslip or irregular surface 326 (see FIG. 4) on the side of the support mount 300 that makes contact with the surface from which the support mount 300 hangs.

Referring to FIG. 7, the device frame 200 may have a device frame interior 202 surrounded by device frame walls. The device frame walls include a frame top 206, and a frame bottom 208 opposing the frame top 206. The device frame walls also include a frame first side 210, and a frame second side 212 opposing the frame first side 210, the frame sides 210, 212 positioned between the frame top 206 and the frame bottom 208. Equipment such as power sources (for example, batteries and/or power supplies), processors, computer memory, ports, and cooling fans may be attached to the frame walls or provided within the device frame interior 202. The separate components of the equipment provided with the module 10 may interface with each other and with external components. Components in the frame interior 202 are preferably accessible through the device frame walls and/or case walls. For example, a power supply in the device frame interior 202 may interface with a power plug (not shown) in the device frame walls, and the power plug may be accessible through resealable side openings 116, 118 in the case sides 110, 112. A vent 214 (for example, openings in the case walls that enhance air circulation) may be included in the device frame walls for heat dissipation.

Referring to FIGS. 1 and 6, the first sidebar 302 may extend from the frame/case first side 210/110 along a first sidebar axis, and the second sidebar 304 may extend from the frame/case second side 112 along a second sidebar axis. The sidebars 302, 304 may be anchored to the sides of the device frame 200, extending outwardly from the case interior 102, such as through resealable first and second sidebar openings 120, 122 in the case first and second sides 110, 112, respectively. The sidebars 302, 304 may be stowed when the module 10 is being relocated and may be deployed as needed, such as by pivoting, or they may be permanently deployed. As depicted in FIG. 3A, the sidebars 302, 304 would preferably make at least a 30 degree angle with the appendage plane when deployed (and most preferably a 45-90 degree angle). When the module 10 is hanging from, for example, the roof of a server cabinet 20 or the top panel of a doorway, the first and/or second sidebars 302, 304 may butt against the side panels of the cabinet 20 or doorway to help keep the module 10 stationary (see FIG. 1).

As depicted in FIGS. 2 and 3A, the resealable first side and second side openings 116, 118 extend into the case interior 102. These openings 116, 118 may allow the equipment within the case interior 102 to communicate with external equipment through various connectors 12, 14. For example, the device frame 200 may have a communication port 216 and a power supply integrated therewith, and the openings 116, 118 may allow easy access to the case interior 102 and equipment therein. The module 10 preferably includes multi-function connections that provide the ability to interface with a variety of equipment using one or more communication protocols.

Additionally or alternatively, various pieces of equipment can be affixed to the exterior walls of the device frame 200, immovably or movably. For example, a display device 218 (such as a monitor or other display screen) may be affixed to the outer surface of the device frame walls. A processor/computer (such as a single-board computer ("SBC") that incorporates a processor, memory, and storage), one or more input devices (such as a keyboard 220 and/or a mouse), and ports/devices that interface with the equipment being diagnosed (such as a serial connection device commonly used in data centers) can also be affixed to the device frame 200. Such equipment may be connected to the case walls, to the device frame walls, or to both the case walls and the device frame walls. Although the device frame 200 may be immovable with respect to the case walls, the equipment affixed to the device frame 200 may be movable with respect to the device frame 200. For example, the display device 218 in the case interior 102 may swivel with respect to the device frame 200 (the bottom of the monitor is tilted forward in FIG. 6) even though the display is otherwise anchored to the case 100 via the device frame 200. A keyboard 220 may also deploy by being flipped open from a stowed position. An optional padding unit 222 that muffles noises may be affixed to the device frame 200 such that the keyboard 220 makes contact with the padding unit 222 (rather than other portions of the device frame 200) when being deployed.

A method of using the module 10 includes extending the second end 310 of appendage 306 from the module 10 (for example, from the case 100 or the frame top 206) along the appendage plane. The support mount 300 may then be moved (such as by pivoting at the hinge mechanism 344) to the deployed position 316, preferably such that the support mount plane makes substantially a 90-degree angle with the appendage plane. The user 24 may then lift the module 10 and hang it from the surface, such as from the roof of the cabinet 20 or the door 22. If a case 100 is included with the module 10, the user 24 may then unseal the first opening 104 to access the case interior 102. The user 24 then deploys the keyboard 220 by, for example, pivoting it so that it makes a substantially 90-degree angle with the display device 218. If the module 10 would benefit from stabilization because, for example, it is hanging from the roof of the cabinet 20, then the first and second sidebars 302, 304 may be extended, pivoted, inserted, or otherwise engaged from the frame sides 210, 212. Preferably, the sidebars 302, 304 are positioned such that they make substantially a 90-degree angle with the appendage plane. Once the module 10 is in position, the user 24 can begin using the module 10's equipment, such as to interface with a server or other computer.

The mobile module 10 provides many advantages and overcomes the shortcomings of conventional rolling carts and computer bags. The module 10 behaves as a comprehensive diagnostic rolling cart housed in a highly-portable device frame 200 and/or case 100, allowing a user 24 to connect to various equipment while the module 10 provides a stable work space. It can include a monitor, keyboard 220, and mouse as well as other equipment in an assembled and virtually ready-to-go state. The module 10 can hang from cabinets 20 or other surfaces using its versatile support mount 300, while maintaining stability using sidebars 302, 304 that are deployable as needed. The module 10 can be either left in the data center or it can be removed from the data center and stored in a more secure location (for example, an office, cubicle, closet, etc.), helping ensure its integrity and availability when needed. When a systems administrator needs to use the mobile diagnostics module 10, it can be easily carried to the cabinet 20 housing the troubled server. Because of its small form factor, it can be used in tight spaces in data centers. If a business has multiple data centers, the module 10 can be carried between them. Because it can be used as a backpack, the module 10 can even be taken as carry-on luggage on airplanes and stowed in overhead compartments.

The mobile module 10 is well suited for businesses with data centers or server rooms, collocation facilities, Internet hosting facilities, technology companies with field service technicians, and other entities with the need for mobile, multi-function connectivity to equipment. Field technicians and critical facilities managers requiring diagnostics or other equipment in a reliable, efficient, versatile, and function driven manner would greatly benefit.

Further advantages and features of the invention will be apparent from the remainder of this document in conjunction with the associated drawings.

DETAILED DESCRIPTION OF PREFERRED VERSIONS OF THE INVENTION

Figure 7:
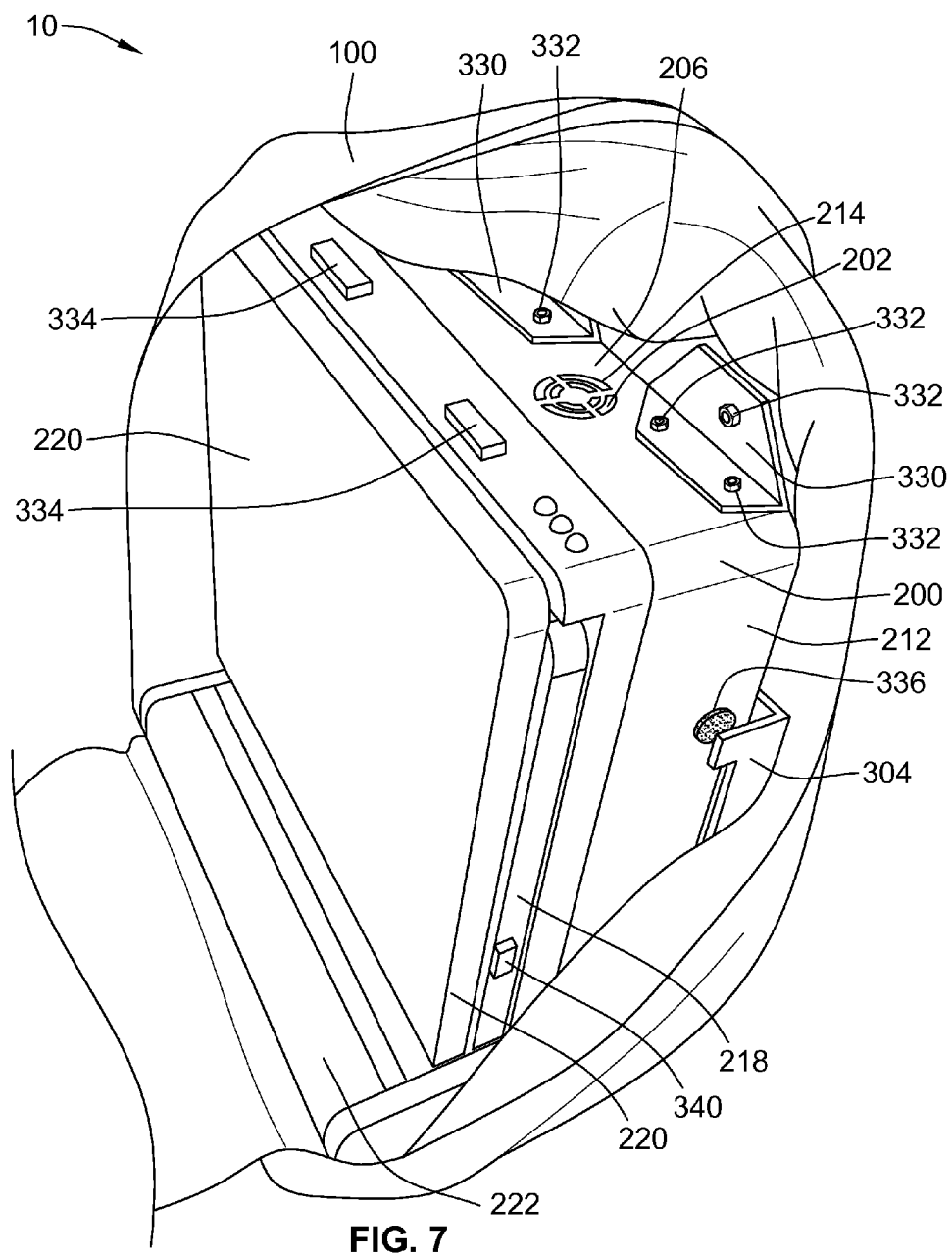
FIG. 7 is a front perspective view of the module 10 of FIG. 1 with a portion of the case 100 pulled back to reveal the case interior 102 and the connected device frame 200 therein.
Figure 8:
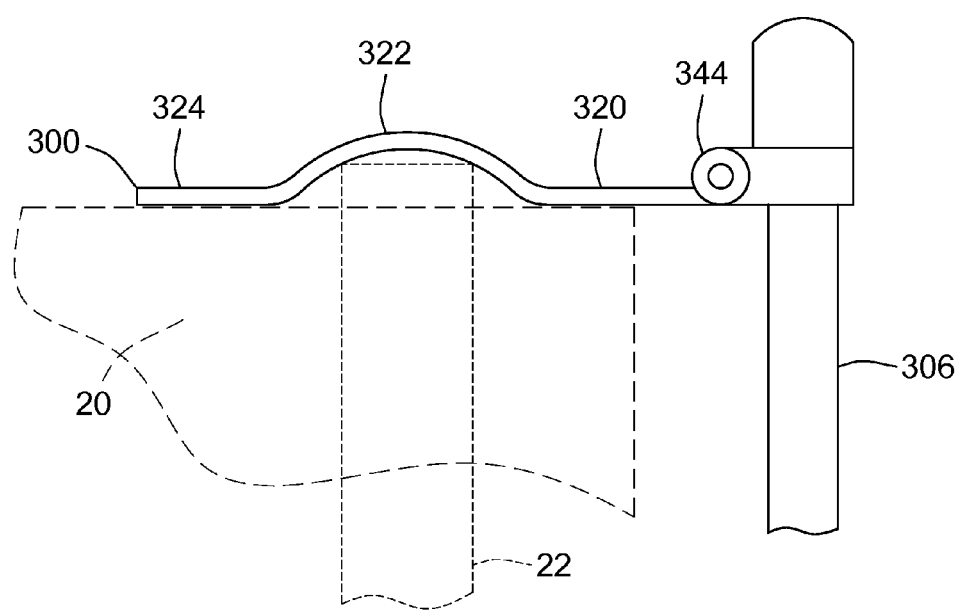
FIG. 8 is a side view of the support mount 300 of FIGS. 1 and 3-6, extending from the appendage 306 in a deployed position, with phantom lines representing the ability of the support mount 300 to hang from different surfaces.

Although the module 10 is shown to include the device frame 200 housed by the case 100, the module 10 may include just the device frame 200, just the case 100, or both the device frame 200 and the case 100. As shown in FIG. 7, the device frame 200 may be anchored to the case 100 via a frame mount 330 affixed to both the case 100 and the device frame 200 via fasteners 332. But removing the frame mount allows the device frame 200 to separate from the case 100. Independent from the other, the case 100 or the device frame 200 may include the appendage 306 (with or without the support mount 300), sidebars 302, 304, affixed diagnostics equipment, and other equipment. If the device frame 200 is not included, the equipment (such as the appendage 306, sidebars 302, 304, and/or display) may be anchored directly to the case 100 via a rigid mount or other support mechanism (not shown).

The appendage 306 extendable from the case top 106 and/or the frame top 206 is depicted in the figures as having an inverted "U" shape with two vertical arms connected by the horizontal appendage handle 314. The two-armed appendage 306 is also shown with a two-piece support mount 300 extending from each arm. The appendage 306 may include, alternatively, one arm extending from the case 100, with an optional looped handle (not depicted) extending from the end of the appendage 306 to aid portability. If an appendage 306 with a single arm is used, then a one-piece support mount 300 may suffice to allow the module 10 to hang from a surface. Additional support mounts 300 may be added at various positions to the appendage 306 or elsewhere on the module 10 to permit the module 10 to hang, for example, at varying heights, from other structures, or in different configurations.

As depicted in the figures, the case 100 may include additional resealable openings 128, 130 (see FIG. 2) that open into other compartments that are able to house, for example, cables (such as cable 12) or other items. The case 100 may include at least one outside pocket to accommodate screwdrivers or other tools that the user 24 might need. Because the equipment in the module 10 (for example, equipment affixed to the device frame 200) is preferably replaceable, the pockets may be used to store replacement equipment in case 100 of a malfunction. The equipment of the module 10 may also be replaceable in case 100 specialized equipment is desired for a particular application. For example, if a different processor or input device is required, the processor or device may be swapped or added.

The case 100 in the figures is primarily depicted with "soft" walls (made of, for example, a durable fabric, nylon, leather, etc.), preferably with a sturdy bottom and/or back. However, the case 100 may partially or completely have sturdier "hard" walls made of relatively rigid material such as plastics, metals, or composites. The walls of the case 100 may be a hybrid of hard and soft by using, for example, fabrics on certain portions and rubber, plastic, or metal on other portions for padding and/or protection of sensitive electronics. For example, in the soft case depicted in the figures, the module may include a sturdy bottom and/or back for support and to allow the module to remain upright when stationary.

The material used in the case 100 is preferably durable, light, and water resistant. The device frame 200 is preferably made from a metal or metal alloy, plastic, composite, or other rigid material. The appendage 306 may be made from a plastic or metal, and the support mount 300 may be made from a rigid metal able to support the weight of the module 10. Alternatively, a bungee-type system can also be used to hang the module 10, although such a system may be less stable. The sidebars 302, 304 may also be made from a variety of materials, such as metals and/or plastics. The padding unit 222 may be made with any material that is able to dampen noise, such as rubber or plastic. Different materials and dimensions may be provided to obtain the desired size, weight, and form factor for the module 10 having the device frame 200 and/or the case 100.

When the sidebar shown in FIG. 7 is stowed (for example, by being rotated such that it is substantially vertical), it can optionally be affixed to the device frame 200 using adhesive, Velcro pieces 336, 338 (see also FIG. 3A) mutually-attractive magnetic pieces, or another mechanism. The sidebar need not, however, be stowed through rotation, as the sidebars 302, 304 may be retractable into the device frame interior 202 or separable from the module 10 (and easily stored in compartments incorporated in the case 100).

The hinge mechanism 344 used to affix the support mount 300 to the appendage 306 may permit the support mechanism to rotate through a 90-degree angle. For example, the support mount 300 may be parallel with the appendage 306 when stowed 318, and it may pivot to become substantially perpendicular to the appendage 306 when deployed 316. The support mount 300 may alternatively be stowed by being retractable within the appendage 306 rather than being pivotably affixed to the appendage 306 at one end. As previously discussed, the support mount 300 may be permanently deployed in a ready-to-hang position.

Also shown in FIG. 7, the input device (for example, the keyboard 220 shown) may be released using one or more keyboard release latches 334 that allows the keyboard 220 to deploy by pivoting down. A display device latch 340 may be used to release the display device 218 (here, a monitor) so that it swivels or otherwise changes angles with respect to the device frame 200.

To use the mobile module 10, a user 24 may roll (using the optional wheels 328 and legs 342) or carry the module 10 (using the appendage handle 314 and/or case handle 114) to, for example, a troubled server in a data center cabinet 20. The appendage 306 may then be extended up from the top of the module 10, and the support mount 300 pivoted up so that it is substantially perpendicular with the appendage 306. The module 10 may then be lifted up and the support mount 300 rested on the surface on which the module 10 is to hang (such as the roof of the cabinet 20 or a door 22). Data center cabinets 20 may not include doors 22, so the support mounts 300 provide versatility in being usable in different settings. Depending on the contours of the surface, the module 10 may be adjusted so that the support mount 300 rests stably and securely on the particular surface.

To provide stability when the module 10 is hanging, particularly from the roof of a cabinet 20 or the top panel of a doorway, the module 10's sidebars 302, 304 may be extended or otherwise attached if they are separable from the module 10. The module 10 may alternatively or additionally be provided with other stabilizing features. For example, downward-extending tripod legs that contact the floor may be provided, or retractable elastic cords ending in hooks (or other hooked arms) may connect with any available support structures in the module 10's surrounding (not depicted).

Once the module 10 is hanging, the height of the module 10 is adjustable so that keyboard 220 is, for example, comfortably at elbow height. Data center cabinets 20 may range in size from about 21.25" to 46" wide, from 23.25" to 96" high, and from 24" to 40" deep, and adjustability of the module 10 allows accommodation of different users 24 in different settings. A quick release system may be incorporated to allow the user 24 to raise and lower the module 10 with one hand.

Figure 1:
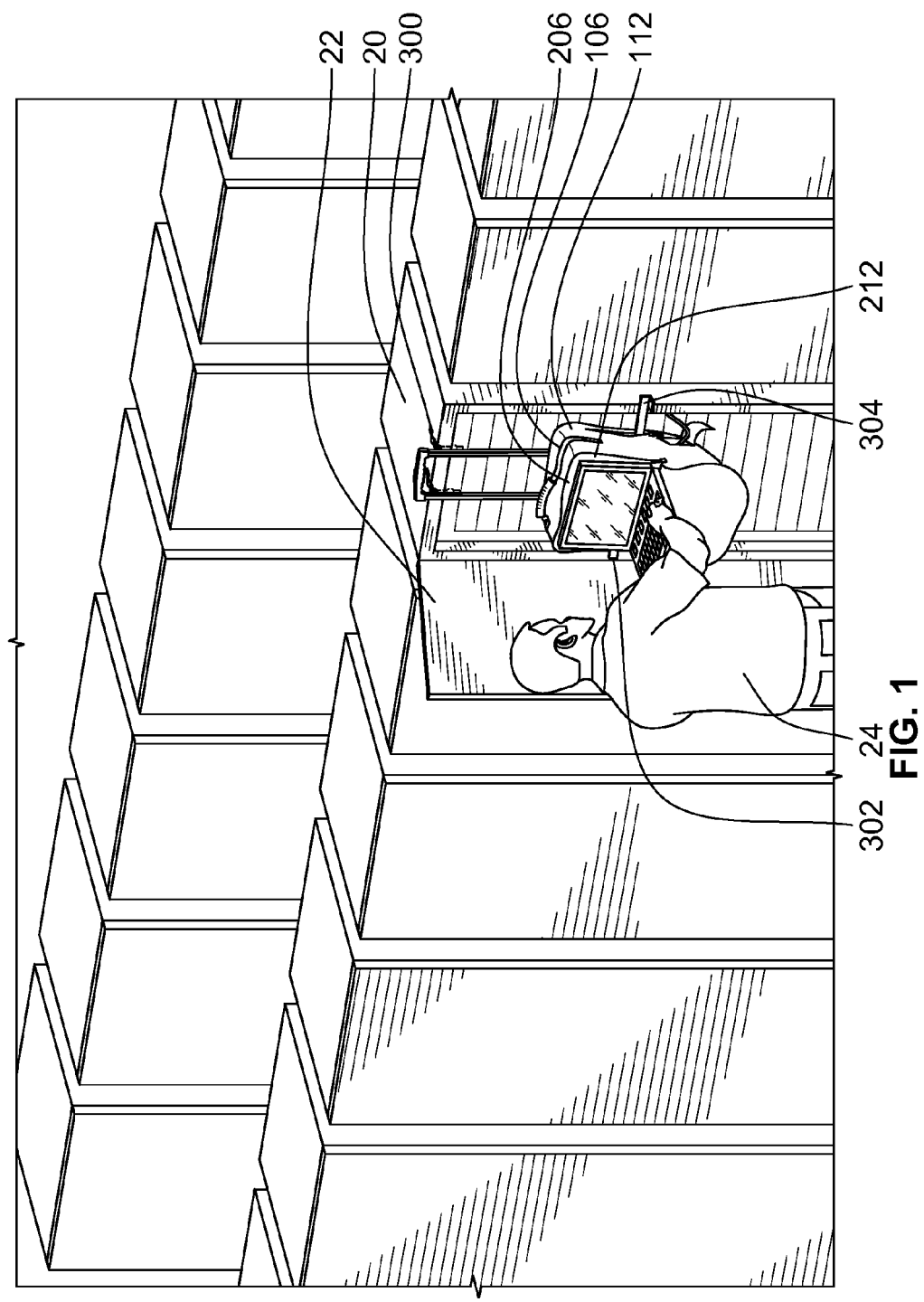
FIG. 1 depicts an exemplary mobile diagnostics module 10 having a case 100 and a device frame 200, the module 10 shown in use at a server cabinet 20 of a data center.
Figure 2:
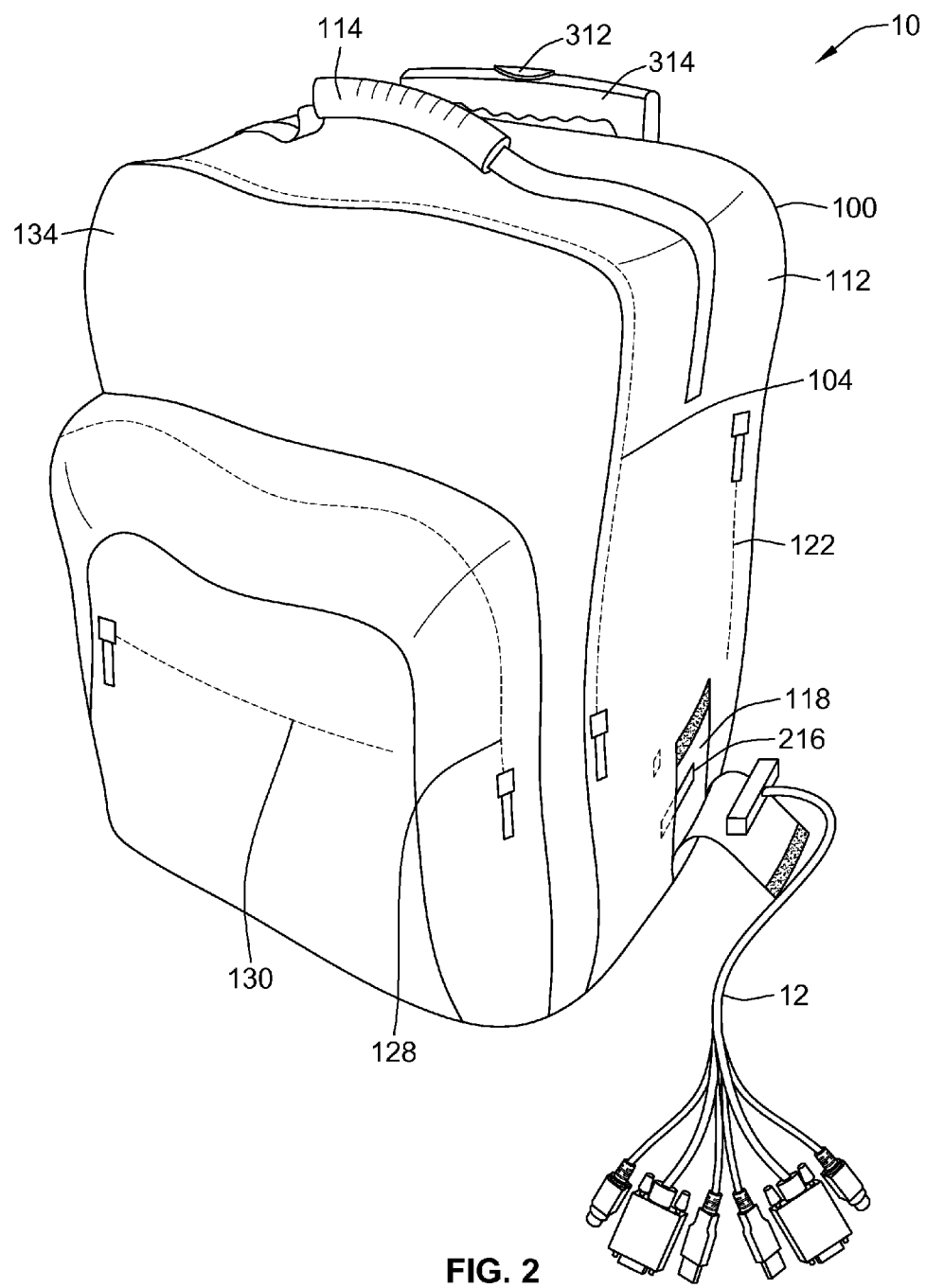
FIG. 2 is a perspective front view of the case 100 of FIG. 1, showing a communication port 216 accessible through an opening in a side of a case 100 and an exemplary multi-function cable 12 that can interface with the communication port 216.
Figure 3:
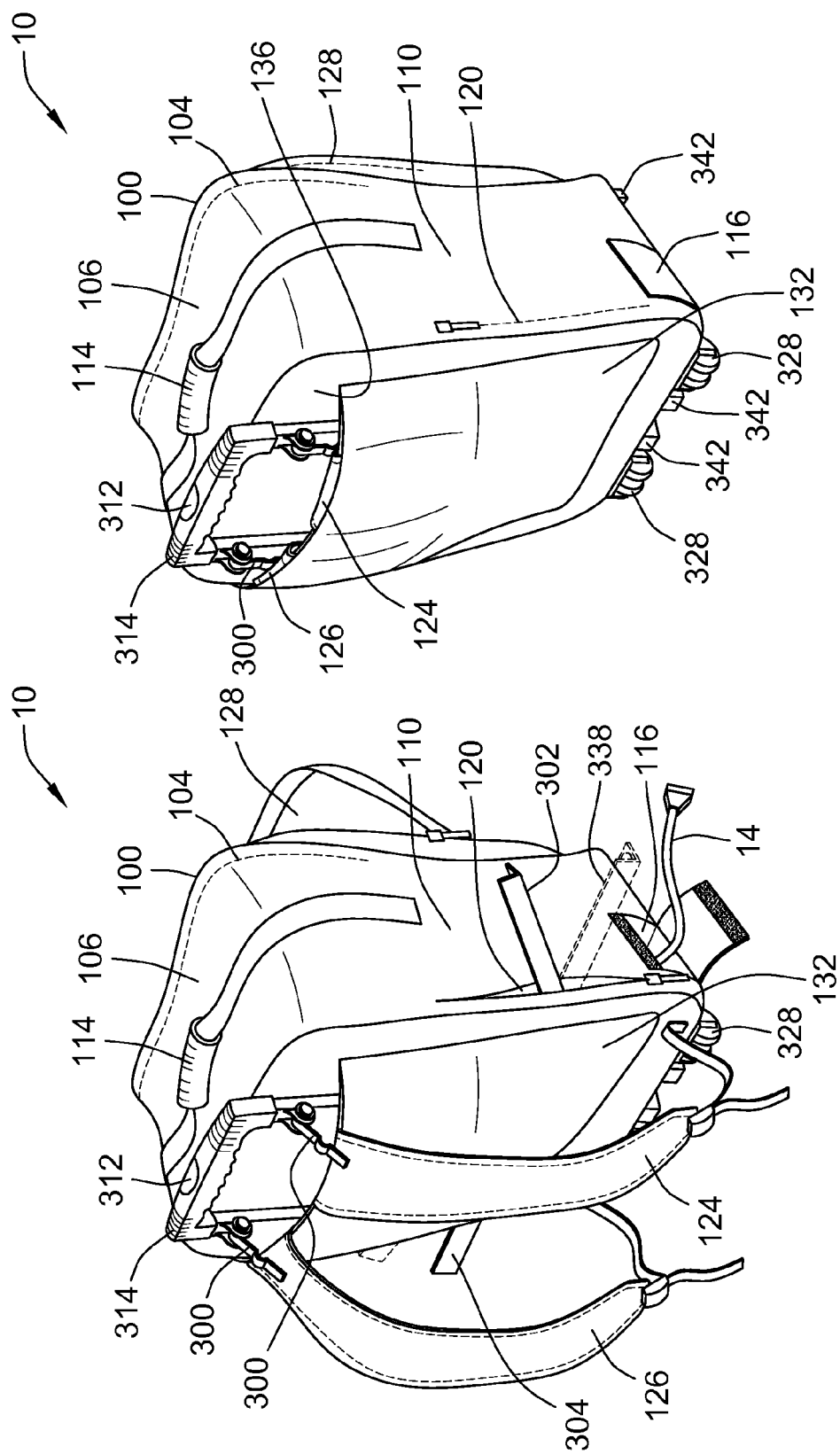
FIG. 3A is a perspective back view of the case 100 of FIG. 1 in a partially deployed state.
FIG. 3B is the perspective back view of FIG. 3A in a substantially stowed state.
Figure 4:
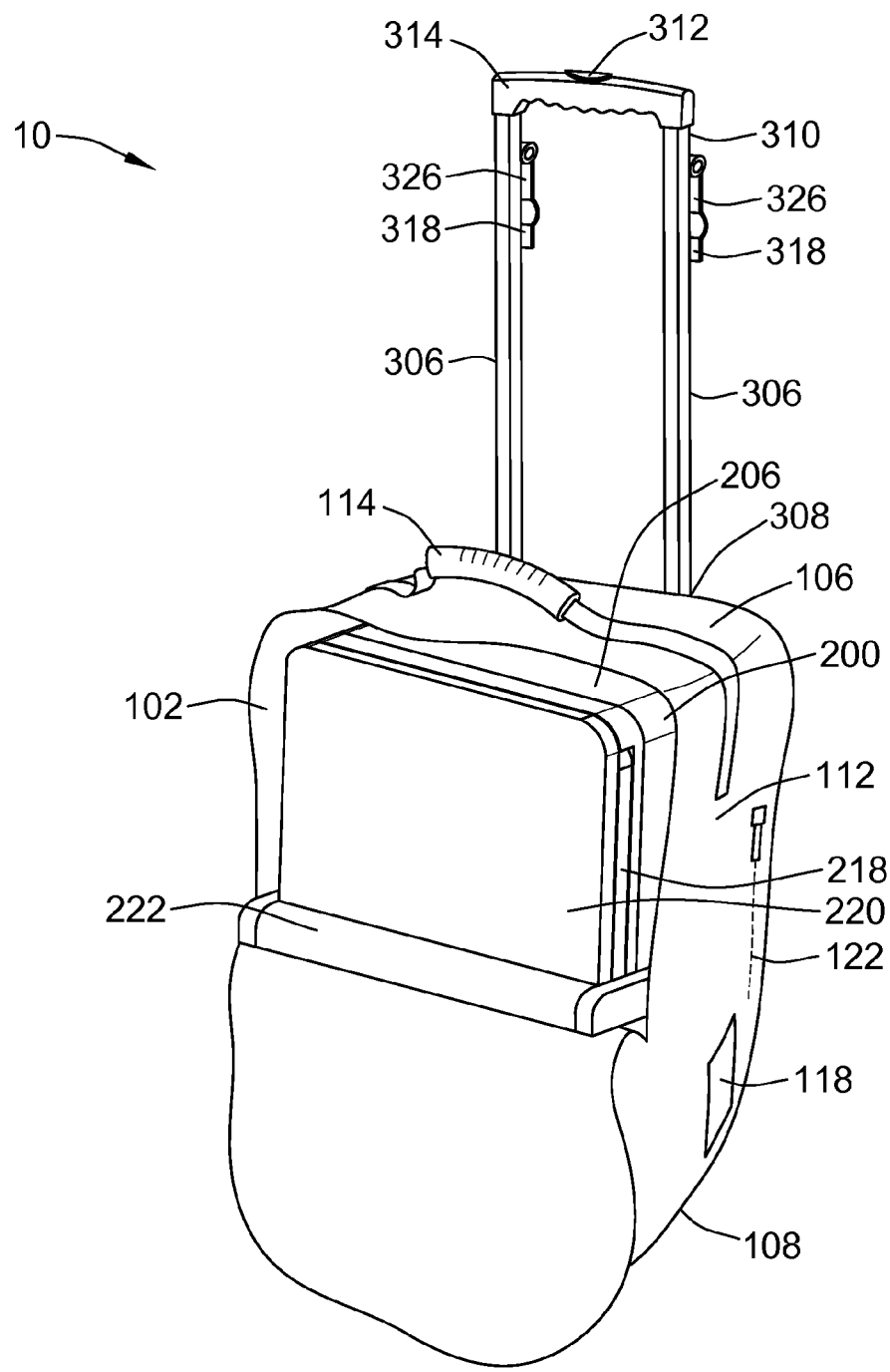
FIG. 4 is a front perspective view of the module 10 of FIG. 1 with a first opening 104 flipped open, an appendage 306 extending from the top of the case 100, and a support mount 300 in a stowed position.
Figure 5:
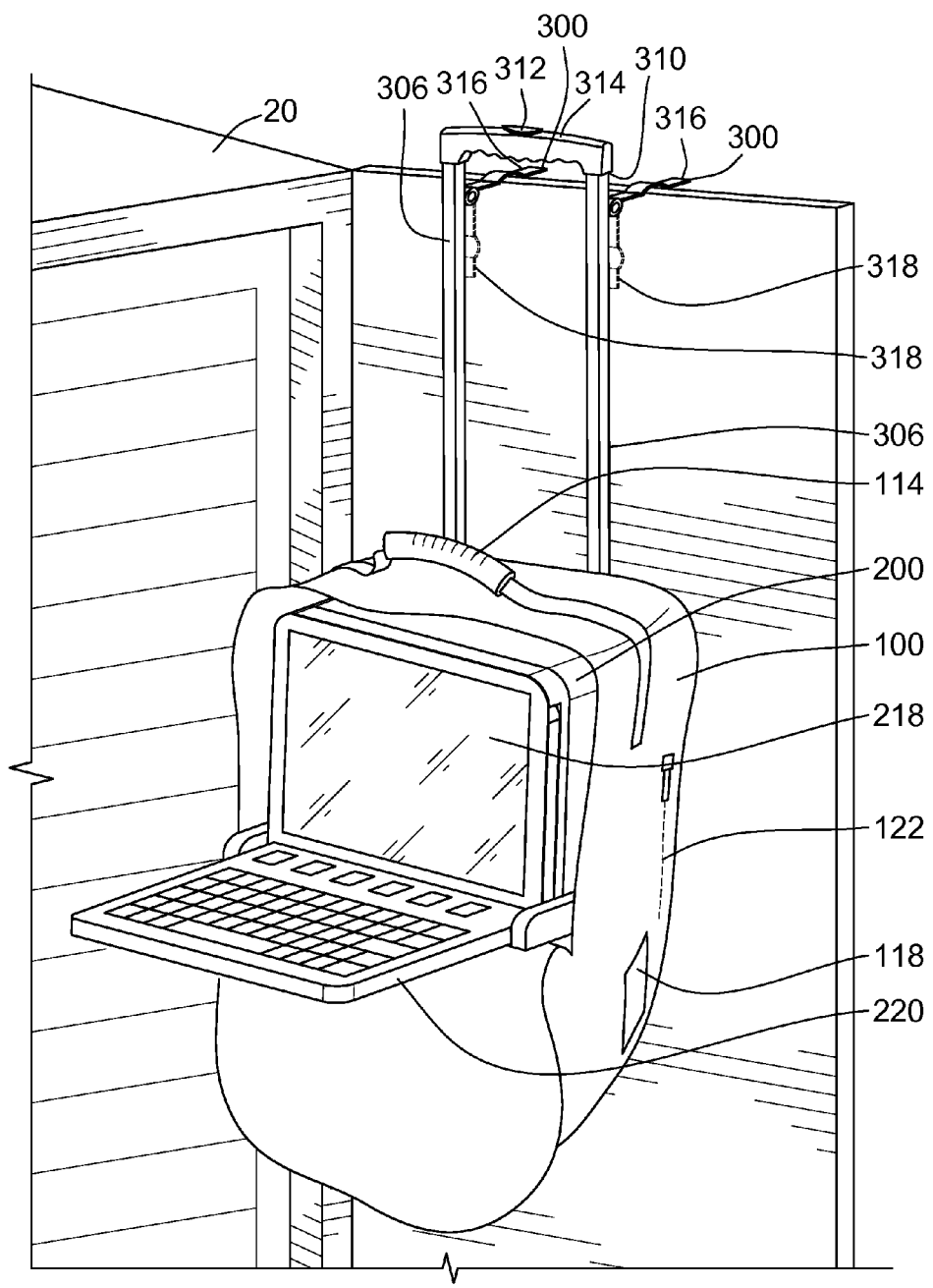
FIG. 5 is a front perspective view of the module 10 of FIG. 4 with the support mount 300 in a deployed position, the module 10 hanging from a cabinet 20 door 22.
Figure 6:
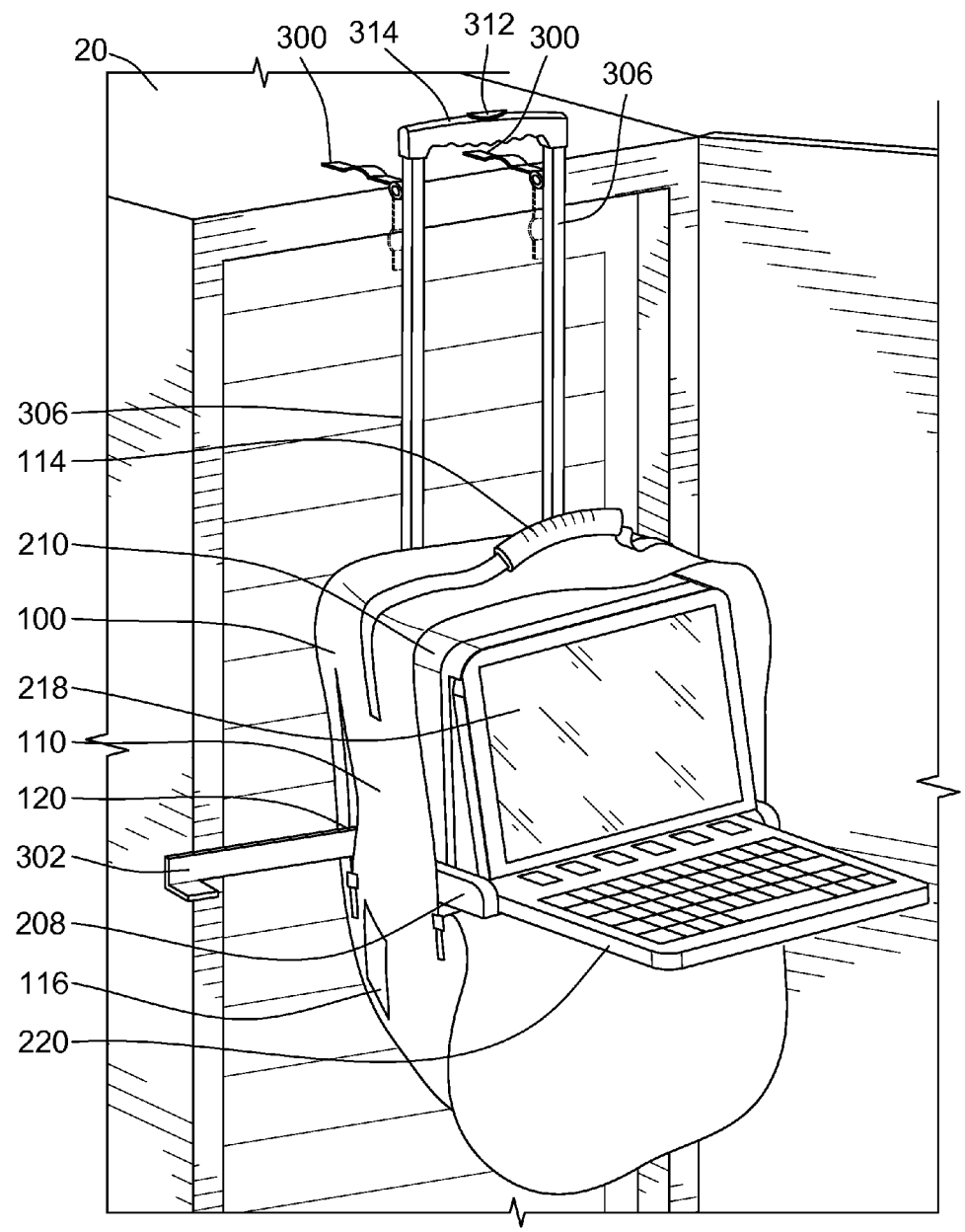
FIG. 6 is a front perspective view of the module 10 of FIG. 5 with a first sidebar deployed, the module 10 hanging from a cabinet 20 roof.

Referring to FIGS. 2, 3B, and 4, the user 24 may then unzip the first opening 104 to access the case interior 102 by flipping a case front 134 open (the case front 134 opposing a case back 136). For example, the resealable first opening 104 may have a first opening 104 closed configuration (as shown in FIG. 2), preferable when the module 10 is in transport, and a first opening 104 open configuration (as shown in FIG. 4), which permits access to the case interior 102. In the first opening 104 closed configuration the case front 134 may at least substantially oppose the case back 136, while in the first opening 104 open configuration the case front 134 may at least partially face the same direction as the case back 136.

Once the case 100 has been opened, the keyboard 220 may be pivoted so that it rotates down to a deployed position, revealing the display device 218 and/or other equipment. A mouse may be incorporated with the keyboard 220 as, for example, a trackball, touchpad, or one-finger mouse. A standard mouse may also be provided for use with a flat slide-out space (not shown). The keyboard 220 may have a QWERTY configuration in a 101-key, laptop-style, or other layout. The display 218 may be a standard VGA LCD monitor with a screen that is sized (for example, 13" or 15") by balancing factors such as overall module 10 dimensions, weight, and cost. Because the display 218 may face forward (toward the user 24's chest rather than the user 24's eyes) depending on the relative height of the module 10, the bottom of the display may be adjusted so that its screen is angled toward the user 24's eyes.

Once the keyboard 220 is deployed, the module 10 may be connected to the server or computer to be diagnosed. A serial, USB, or other cable (for example, cables 12, 14) may be extended from the module 10 or separately attached to the module 10 for physical connectivity to the server (see, for example, FIG. 3A). Alternatively or additionally, a multi-function cable that accommodates, for example, VGA/USB/PS2 connections may be used (see, for example, FIG. 2). Cables can interface with the module 10 through, for example, retraction/extension and/or through connection with a recessed port in the module 10. Wireless connectivity may also be provided to allow the module 10 to communicate with remote servers or multiple computers. Switching between two or more servers and/or connections can be accomplished using, for example, a switch or key sequence (such as CTRL, CTRL, End). A "KVM" or other switch may control, for example, how the keyboard, video, mouse and/or other signals are routed.

Additionally, because of the legs 342 and sturdy base (due to the sturdy device frame bottom 208 or due to extra support integrated with the case bottom 108), the module 10 is stable enough to sit on a flat surface such as a table, cart, or floor rather than be hung. The module 10 may incorporate padding so that electronic components are not damaged if the module 10 is dropped or jarred. The padding may be added, for example, to the device frame walls or the case walls.

Additional appendages 306 and/or appendage arms, sidebars 302, 304, or other structures extendable from the module 10 may be incorporated to enhance stability in different settings. These structures may be extended by either pulling (for example, if it is retractable), swinging (for example, if it pivots), or insertion (for example, by inserting a separate removable structure like a bar into a complementarily-sized receptacle in the module 10).

As shown in FIGS. 2 and 3, the case 100 may have the dimensions of a backpack, with the sum of its length, width, and depth no more than 45 inches to conform with current FAA (Federal Aviation Administration) guidelines for carry-on luggage. Using shoulder straps 124, 126 (see FIG. 3A), which can be conveniently stowed in a case pouch 132 on the back of the case 100 (see FIG. 3B) when not being used, the case 100 can be worn on a person's back (padding may be provided on the back of the case 100 for the comfort of the user 24). The module 10 (with the device frame 200 and/or the case 100) is preferably eight pounds or less to allow for easy carrying, lifting, and hanging.

The equipment mounted to the module 10 may serve as a mobile build server useful for quick rebuilds and deployments of new servers. To provide this application, build deployment software and server build images may be installed a hard drive or other storage medium of the computer. An Ethernet cable may extend from the module 10 to connect to the server and communicate to it the new build.

The module 10 preferably accommodates 220V or other outlets in addition to 110V outlets. Various power connection plugs (such as NEMA 5-15P and NEMA 6-15P) may also be accommodated, such as with an adapter. A side of the device frame 200 may provide a power connection that interfaces with a power supply that is, for example, positioned in the frame interior 202. The power connection may be accessible to a power plug through an opening in the side of the case 100 (for example, openings 116, 118). A rechargeable battery pack may be incorporated in the module 10 to enhance portability.

The mobile module 10 illustrated above is well suited for troubleshooting computers in computer rooms and data centers, but it may be used with any device(s) intended for interfacing with, troubleshooting, and maintaining any equipment. Its versatility makes it configurable for other uses and settings involving, for example, audio/video or other electronics, mechanical devices, chemical kits, biological tools, or other objects. That is, the module 10 (with the device frame 200 and/or case 100) may be provided with the tools necessary for any appropriate setting or application.

It should also be understood that various terms referring to orientation and position are used throughout this document—for example, "top" (as in "extendable from the case top 106") and "bottom" (as in "the bottom of the monitor is tilted forward")—are relative terms rather than absolute ones. In other words, it should be understood (for example) that the case top 106 may be located at the bottom or side of the module 10 depending on the overall orientation of the module 10. Thus, such terms should be regarded as words of convenience, rather than limiting terms.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A mobile diagnostics module including:
   a) a case for receiving equipment;
   b) an appendage extendable from the case along an appendage plane; and
   c) a hinge mechanism secured to the appendage; and
   d) a support mount extending from the hinge mechanism along a support mount plane,
   (1) the support mount having:
      (i) a first flat portion extending from the hinge mechanism in a support mount direction, the first flat portion being at least substantially coplanar with the support mount plane, wherein the first flat portion sits on a cabinet roof when the case is hung from the cabinet roof by the support mount;
      (ii) a valley portion extending from the first flat portion, the valley portion bulging out of the support mount plane, wherein the valley portion receives at least part of a door when the case is hung from the door by the support mount; and
      (iii) a second flat portion extending from the valley portion farther in the support mount direction, the second flat portion being at least substantially coplanar with the support mount plane; and
   (2) the support mount being movable with respect to the appendage via the hinge mechanism such that the support mount plane pivots with respect to the appendage plane, the support mount being movable between:
      (i) a support mount stowed position in which the support mount plane is at least substantially parallel with the appendage plane; and
      (ii) a support mount deployed position in which the support mount plane is at least substantially perpendicular to the appendage.

2. The mobile module of claim 1, wherein the appendage plane is not coplanar with the support mount plane.

3. The mobile module of claim 1, wherein in the support mount deployed position the support mount extends farther away from the appendage than in the support mount stowed position.

4. The mobile module of claim 1, wherein:
   a) the support mount has a support mount first side and a support mount second side opposing the support mount first side,
   b) the support mount first side contacts a surface in the support mount deployed position, and
   c) the support mount first side includes a nonslip or irregular surface.

5. The mobile module of claim 1, wherein:
   a) the case includes case walls surrounding a case interior, the case walls having:
      1) a case top, and a case bottom opposing the case top; and
      2) a case first side, and a case second side opposing the case first side, the case first side and the case second side positioned between the case top and the case bottom;
   b) the appendage extends from the case top; and
   c) the case further includes a first sidebar extending from the case first side.

6. The mobile module of claim 1, wherein:
a) the case includes case walls surrounding a case interior, the case walls having:
   1) a case top and a case bottom opposing the case top; and
   2) a case first side and a case second side opposing the case first side, the case first side and the case second side positioned between the case top and the case bottom;
b) the appendage extends from the case top; and
c) the case includes a resealable first side opening in the case first side, the first side opening providing access to the case interior.

7. The mobile module of claim 6 further including a device frame having a communication port, wherein:
a) the device frame is secured to the case, the device frame being positioned within the case interior, and
b) the communication port is accessible through the first side opening of the case.

8. The mobile module of claim 1 further including:
a) a device frame immovably affixed to the case; and
b) a display device secured to the device frame, the display device being positioned within a case interior.

9. The mobile module of claim 1 further including:
a) a device frame positioned within a case interior, the device frame secured to the case; and
b) an input device secured to the device frame, the input device being positioned within the case interior.

10. The mobile module of claim 1 further including a device frame secured to a case, the device frame being positioned within the case interior, the device frame including:
a) device frame walls surrounding a device frame interior; and
b) a power source secured to the device frame, the power source positioned within the device frame interior.

11. The mobile module of claim 1 further including a rigid device frame secured to the case, wherein:
a) the case is a flexible outer shell at least partly enclosing the device frame; and
b) the device frame is configured to be pivotably securable to a display device.

12. The mobile module of claim 1 further including a display device secured within a case interior such that the display device would not fall out of the case with:
a) a first opening in an open configuration;
b) the display device exposed through the first opening; and
c) the case positioned at least substantially upside-down.

13. The mobile module of claim 1:
a) further including:
   1) a first sidebar extending from a first side of the case; and
   2) a second sidebar extending from a second side of the case, the second side of the case opposing the first side of the case;
b) wherein module is configured such that the first sidebar and the second sidebar can abut a first cabinet side and a second cabinet side, respectively, while the module hangs from a cabinet roof.

14. A mobile diagnostics module including:
a) a case for receiving equipment;
b) an appendage extending from the case;
c) a hinge mechanism extending from the appendage;
d) a support mount secured to the case, the support mount:
   1) being pivotable with respect to the appendage via the hinge mechanism, the support mount being pivotable between:
      (i) a support mount stowed position in which the support mount is at least substantially parallel with the appendage; and
      (ii) a support mount deployed position in which the support mount is at least substantially perpendicular to the appendage;
   2) the support mount having:
      (i) a first flat portion extending from the hinge mechanism in a support mount direction and along a support mount plane, wherein when the case hangs from a cabinet roof via the support mount, the first flat portion rests atop the cabinet roof such that the support mount plane is at least substantially parallel with a cabinet roof plane;
      (ii) a valley portion extending from the first flat portion, the valley portion bulging out of the support mount plane, wherein when the case hangs from a door by the support mount, the valley portion receives at least a part of the door; and
      (iii) a second flat portion extending from the valley portion farther in the support mount direction, the second flat portion being at least substantially coplanar with the support mount plane.

15. The mobile module of claim 14 wherein a case is configured to secure equipment within the case interior while the equipment is being accessed through a first opening.

16. The mobile module of claim 14 further including a sidebar extending from a side of the case, wherein the sidebar is configured to stabilize the module while the case is hanging.

17. The mobile module of claim 14 wherein the support mount is configured to allow the module to hang from a cabinet roof with at least a majority of the case remaining substantially outside of the cabinet.

18. The mobile module of claim 14 wherein the support mount is configured such that when the case hangs from a door, the first flat portion and the second flat portion are situated on opposing sides of the door.

19. The mobile module of claim 16:
a) wherein the sidebar is a first sidebar and the side of the case is a first side of the case;
b) further including a second sidebar extending from a second side of the case, the second side opposing the first side;
c) wherein the first and second sidebars are configured to substantially block the module from entering a cabinet when the case is hanging from a roof of the cabinet.

20. A mobile diagnostics module including:
a) a case configured to secure equipment thereto;
b) a case main axis extending from a case top to a case bottom; and
c) an appendage extending from the case;
d) a hinge mechanism extending from the appendage;
   (1) a support mount having:
      (i) a support mount long axis that is pivotable with respect to the case main axis via the hinge mechanism;
      (ii) a first substantially flat portion extending from the hinge mechanism in a support mount direction and in a support mount plane, wherein the first flat portion rests on a top surface of a cabinet roof when the case hangs from the cabinet roof by the support mount;
      (iii) a valley portion extending from the first flat portion, the valley portion bulging out of the support mount plane, wherein the valley portion receives at least part of a door when the case hangs from the door by the support mount; and (iv) a second substantially flat portion extending from the valley portion, wherein the second flat portion extends in the support mount direction and in a second flat portion plane that is at east substantially parallel with the support mount plane; and (2) the support mount being movable via the hinge mechanism between:

(i) a support mount stowed position in which the support mount long axis is at least substantially parallel with the case main axis; and (ii) a support mount deployed position in which the support mount long axis is at least substantially perpendicular to the case main axis; and e) a first rigid sidebar extending from the case, and a second rigid sidebar extending from the case, 1) each of the first and second sidebars being pivotable with respect to the case main axis between:

(i) a sidebar stowed position in which the sidebar is at least substantially parallel with the case main axis; and (ii) a sidebar deployed position in which the sidebar is at least substantially perpendicular to the case main axis;

2) wherein when the module hangs by the support mount from a cabinet roof with the first and second sidebars in the sidebar deployed position, the first and second sidebars contact first and second cabinet sidewalls, respectively, to prevent the module from swinging into the cabinet.

\* \* \* \* \*